United States Patent [19]

Sevenich

[11] Patent Number: 5,505,979
[45] Date of Patent: Apr. 9, 1996

[54] PREPARATION OF PROCESS CHEESE USING LIQUID SODIUM CITRATE

[75] Inventor: John R. Sevenich, Mendota Heights, Minn.

[73] Assignee: Hawkins Chemical, Minneapolis, Minn.

[21] Appl. No.: 399,758

[22] Filed: Mar. 7, 1995

[51] Int. Cl.⁶ ............................................. A23C 19/00
[52] U.S. Cl. ........................................................ 426/582
[58] Field of Search ............................................. 426/582

[56] References Cited

U.S. PATENT DOCUMENTS

| | | | |
|---|---|---|---|
| 2,485,637 | 10/1949 | Gooding et al. | 99/116 |
| 5,211,978 | 5/1993 | Merkenich et al. | 426/582 |
| 5,231,225 | 7/1993 | Baniel et al. | 562/513 |
| 5,234,707 | 8/1993 | Merkenich et al. | 426/582 |
| 5,458,909 | 10/1995 | Sevenich | 426/582 |

FOREIGN PATENT DOCUMENTS

| | | |
|---|---|---|
| 934632 | 10/1955 | Germany. |
| 938581 | 2/1956 | Germany. |

OTHER PUBLICATIONS

Food Microstructure, vol. 4 (1985), pp. 297–312, Effects of Emulsifying Agents on the Microstructure and Other Characteristics of Process Cheese—A Review, Marijana Caric, Maroslav Gantar, and Miloslav Kalab.

*Primary Examiner*—Donald E. Czaja
*Assistant Examiner*—Linda H. Tonucci
*Attorney, Agent, or Firm*—Merchant, Gould, Smith, Edell, Welter & Schmidt

[57] ABSTRACT

Sodium citrate emulsifying agents can be prepared by contacting a liquid sodium citrate with an effective amount of a source of alkalinity to give a liquid citrate composition containing above 41 wt-% of a tri-salt citrate. The liquid citrate composition can then be combined with a cheese product precursor to produce a processed cheese product.

12 Claims, 2 Drawing Sheets

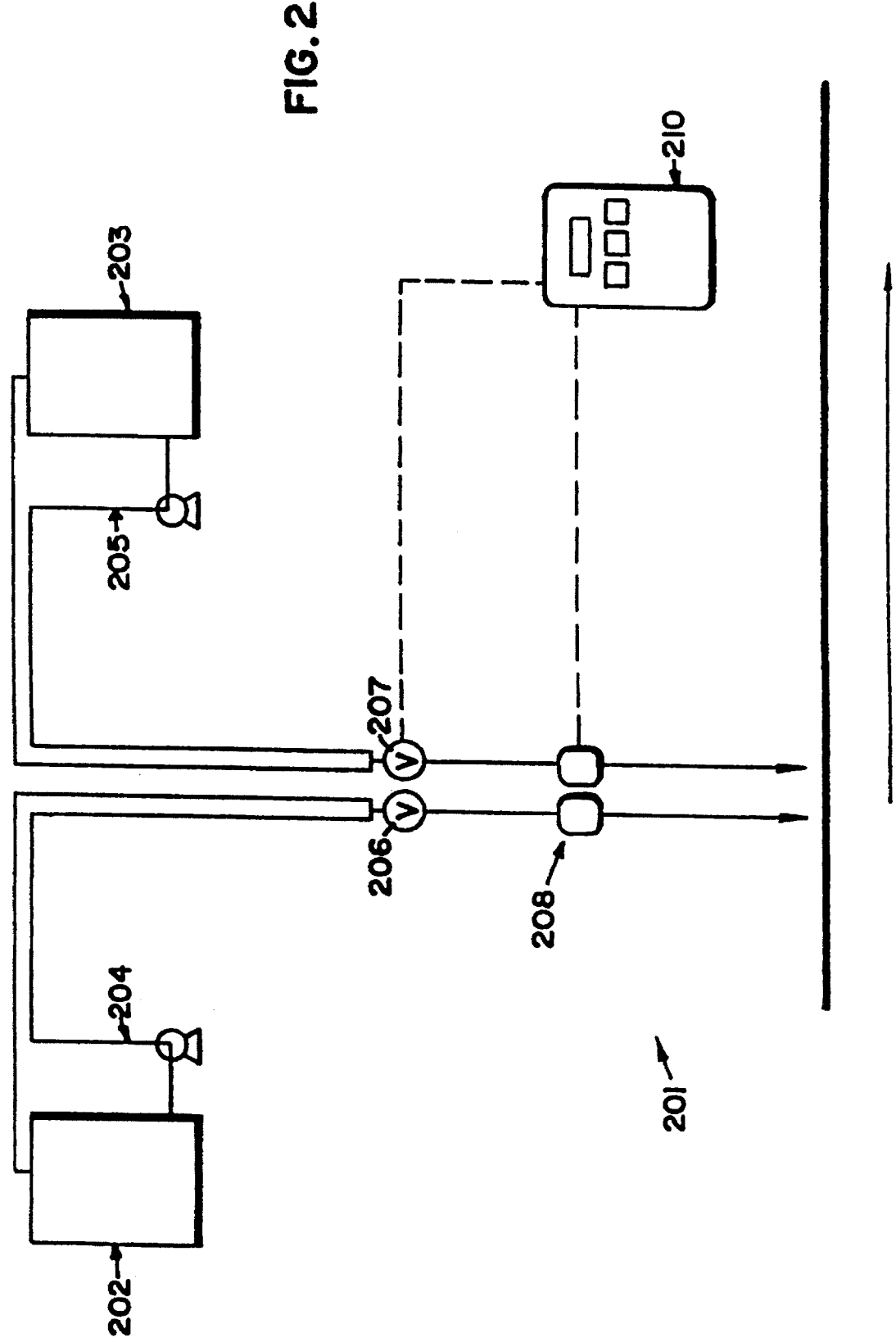

1

PREPARATION OF PROCESS CHEESE USING LIQUID SODIUM CITRATE

FIELD OF THE INVENTION

The invention is related to the preparation of processed food products, specifically, cheese using liquid citrates as emulsifying agents.

BACKGROUND OF THE INVENTION

It is well known that citrates and their salts are useful as emulsifying agents in the preparation of food products, for example, dairy products including process cheese. The preparation and properties of such emulsifying agents are well known. See, U.S. Pat. No. 2,485,637 (Gooding) and German Patent Nos. 938,581 and 934,632.

Sodium citrates are commonly used in the manufacture of process cheese either alone or in mixtures. The sodium citrates complex calcium ions in the cheese to solubilize the protein and increase its hydration and swelling, to facilitate emulsification of fat, impart flexibility to cheese slices and adjust and stabilize pH. (See, Caric et al., *Food Microstructure*, Vol. 4, pp. 297 (1985). Citrates are of great importance to cheese processing because they affect the chemical and physical properties of the finished cheese product. Sodium and potassium citrates are not emulsifiers in the strict sense, i.e. they are not surface-active substances, yet they are commonly included in the group of ingredients called "emulsifying agents". (See Caric et al., *Food Microstructure*, Vol. 4, pgs. 297–312 (1985).

Process cheese is prepared by heating hard cheese and/or soft cheese in a mixture with certain emulsifying agents in a melting process to a temperature above about 80° C. During this melting process, the insoluble starting cheeses are converted into liquid by means of the emulsifying agents. (See U.S. Pat. No. 3,615,586).

The known processes to prepare process cheese typically involve the addition of the sodium citrate emulsifying agents as dry-solids or as a concentrated solution from separate heated storage tanks. Problems are associated with these processes, however. Adding solid sources of sodium citrates can result in a citrate build up within a cooker or blender because the solid citrates do not fully dissolve and stick to the augers. The build-up of citrates on the inside of the cooker or blender causes the cheese to burn during the cooking cycle. Undissolved citrates can also give the processed cheese a lumpy consistency. Furthermore, when a solid source of sodium citrate does not fully dissolve in the process mixture, the residual undissolved solid sodium citrate contributes to the solids that are removed by filters.

Alternatively, if a concentrated liquid source of sodium citrate is utilized in the cheese manufacturing process, this solution must be stored at elevated temperatures (120° to 140° F.) to prevent crystallization of the sodium citrates from solution. Storing the concentrated sodium citrate solution at elevated temperatures requires expensive insulating and heating equipment which increases manufacturing costs significantly. Furthermore, if a malfunction allows the temperature to drop, the solutions can crystallize within the delivery system, resulting in expensive downtime, repairs and/or replacement of the tanks, pumps, valves and piping.

Trisodium citrate, unlike phosphates, can be the subject of bacterial spoilage (See, Caric et al., *Food Microstructure*, Vol. 4, pp. 297 (1985). Solutions of sodium citrate have a pH of around 9.0, therefore, microbial proliferation can easily exist.

Sodium citrate is used in slice cheese primarily because of superior processability versus sodium phosphate. Particularly, slice cheese is subject to ribbon breakage in preparation during its travels over the chill rollers, as it is spread into thin sheets, cut and stacked. Citrates allow the slice cheese greater flexibility than sodium phosphates and is used for this purpose.

The addition of dry solid sources of citrates requires human labor to physically add the appropriate amount of the citrate. This results in substantial bag disposal cost, additions to landfills, and occasionally, human error in measuring the amount of citrate to be added. Injuries from lifting heavy bags are also a concern for employees and employers.

For these reasons, the preparation of process cheese using a dry solid source of sodium citrate or by adding separate amounts of concentrated sodium citrate solutions stored at elevated temperatures is an expensive process. The use of the solid has the same disadvantages as mentioned above for processing cheese. Also, the use of liquid sodium citrate would require heated storage and steam traced piping.

Solutions of trisodium citrate cannot exist above about 35 wt-% at standard temperature and pressure. Thus the use of such a solution is not practical for process cheese makers because the high moisture content exceeds the finished product's allowable moisture content. A process cheese manufacturer could, for example, switch from liquid cream to dry cream to make up for the added moisture from 35 wt-% sodium citrate, but they would lose the advantage of pumping liquid cream vis-a-vis manually handling dry material, and increasing overall costs.

Process cheese manufacturers could switch to a more soluble liquid potassium citrate, but "potassium citrate ($K_3H_5C_6O_7$) is not suitable because it renders the finished product bitter in taste." (See Caric et al., *Food Microstructure*, Vol. 4, pp. 297 (1985).

A need exists for a way to use a liquid citrate product that is high in concentration, does not make the finished product bitter in taste, and does not require heated storage and delivery systems.

A two part citrate system where a liquid sodium citrate is mixed with a base sodium hydroxide 50% fulfills this need.

SUMMARY OF THE INVENTION

The invention is directed to a method for the preparation of food products, specifically, process cheese. The method involves contacting a liquid sodium citrate, containing about 0.01 to 1.0 wt-% preservative, with an effective amount of a source of alkalinity (base) to give a liquid citrate composition preferably containing above 35 wt-% of a tri-salt citrate, wherein the weight ratio of the liquid sodium citrate composition to the weight of base on an anhydrous basis is between 1:1 and 7:1, and combining a food product precursor with the liquid citrate composition. In one embodiment, the invention is directed to an improved method of preparing process cheese, comprising the steps of contacting a liquid sodium citrate with an effective amount of sodium hydroxide to give a liquid citrate composition and combining a process cheese precursor with the liquid citrate composition.

In a preferred embodiment, the invention is directed to an improved method of preparing process cheese comprising the steps of contacting a liquid sodium citrate with an effective amount of sodium hydroxide to give a liquid citrate composition containing above 41 wt-% tri-sodium citrate, and combining a process cheese precursor with the liquid citrate composition wherein the liquid sodium citrate contains about 0.01 to 1.0 wt-% of a preservative, is stored at a temperature between about 40° to 120° F., has a crystallization temperature less than about 110° F., has a pH less than about 8.0 and has a greater concentration of disodium citrate than monosodium citrate.

Due to the problems and expense that exists with the known methods of adding sodium citrates to food products, a substantial need exists for a method of adding sodium citrates to food products which utilizes a liquid sodium citrate starting material, that can be stored at room temperature, and that can provide a tri-salt citrate in the final food product. The method of the invention does not require high temperature storage of the liquid sodium citrate starting material, and reduces the labor costs associated with dry solid sodium citrate bag disposal and manual addition of the dry solid sodium citrate to the food product precursor. Room temperature storage also allows the use of inexpensive poly tanks and normal uninsulated piping for delivery. Further, the invention substantially reduces the frequency of filter changes associated with the removal of undissolved solid sodium citrates in the manufacturing process.

The method of the invention can also result in faster cook times for the food product because the reaction between the liquid citrate and the source of alkalinity is highly exothermic and can produce enough heat to contribute energy to the processing temperature. In addition, "dwell times" associated with dissolving the dry sodium citrate in the process liquid can be greatly reduced or eliminated from the process. In dairy products, creamier textures are observed because of the elimination of unsolubilized dry citrates.

The method of the invention can also be automated which reduces human error, labor and processing times.

BRIEF DESCRIPTION OF THE DRAWINGS

FIG. 2 is a schematic drawing of a continuous manufacturing process that can be utilized to practice the method of the invention.

DETAILED DESCRIPTION OF THE INVENTION

Figure 1:
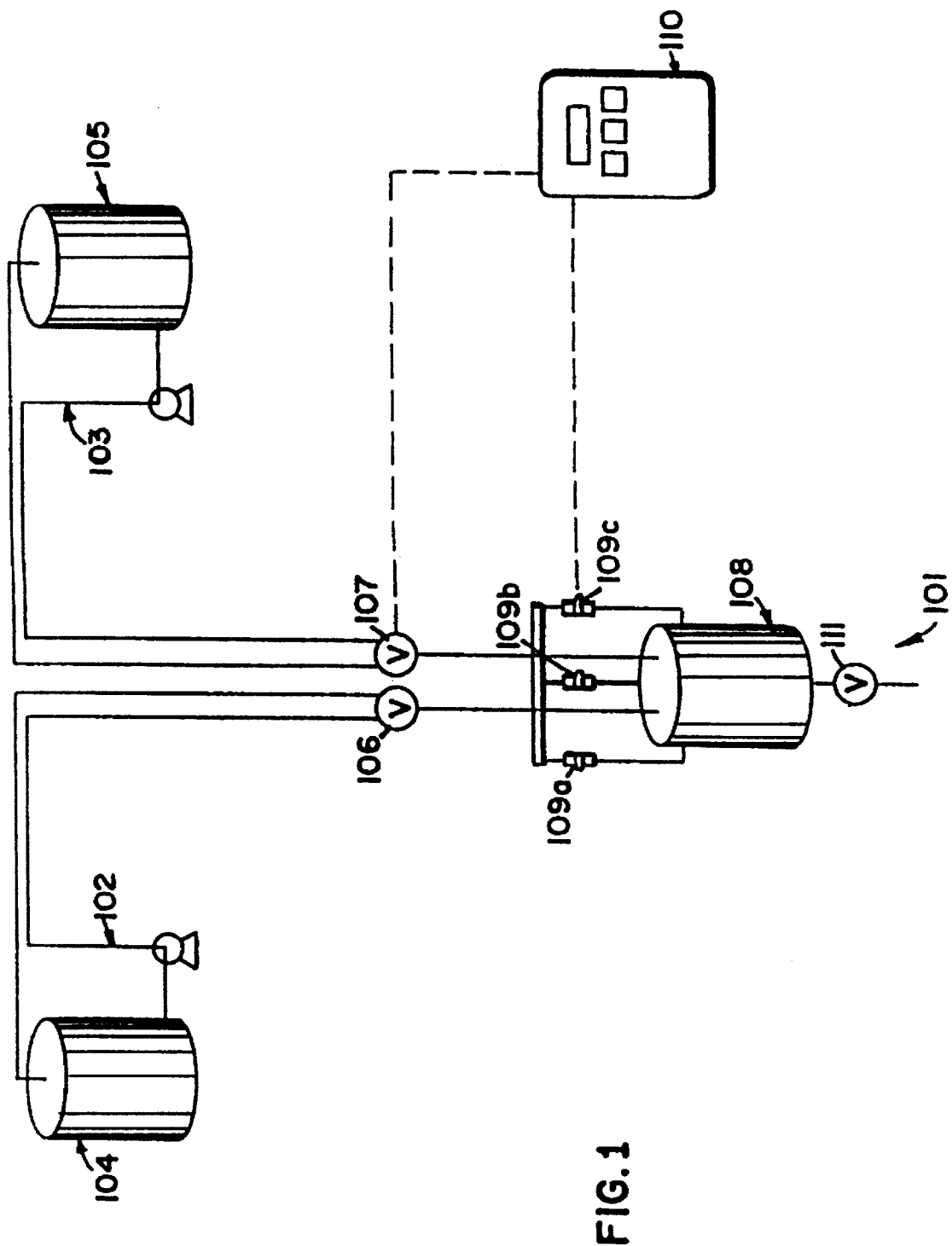
FIG. 1 is a schematic drawing of a batch-type manufacturing process that can be used to practice the method of the invention.

The invention is directed to the discovery that citrate emulsifying agents can be added during the manufacture of a food product using a novel process to produce and then deliver the citrate. Specifically, the invention involves contacting a liquid sodium citrate with an effective amount of a source of alkalinity (base) to give a liquid citrate composition with a predetermined concentration of a tri-salt citrate, preferably above 41 wt-%, and combining a food product precursor with the liquid citrate composition.

The invention can be utilized in any food product manufacturing process which utilizes citrate. Generally, citrates are used as emulsifying agents in dairy products, but the invention should not be limited to such use as emulsifying agents.

Dairy products which can be prepared using the invention include but should not be limited to: cheese, milk, cream, butter and dairy dessert compositions. Preferably, the dairy product comprises a process cheese. Typical ingredients used in the manufacture of process cheese include but should not be limited to: a natural cheese base, emulsifying agents, milk protein ingredients, cream, butter, preservatives, coloring agents, flavoring agents, water, salt, vegetables, spices, and binders.

In the context of this invention, the terms "food product precursor," "dairy product precursor" or "process cheese precursor" include all of the ingredients in the final food product except the citrate. Thus, the addition of the citrate to the food product precursor or, in particular, the process cheese precursor results in a complete food product formulation or, in particular, a complete process cheese formulation or product.

Examples of process cheese include but should not be limited to: dry cheese such as that on CHEETOS®, sliced cheese, cheese dip, and cheese sauce.

The principles of process cheese production are well known and typically involve adding the emulsifying agents (citrates) in either a blending stage where the natural cheese is ground up, or in a cooking stage where the ground natural cheese composition is heated by steam in an auger to produce a homogeneous liquid blend. The process cheese production can be either a batch or continuous system, and the method of the invention can be used in either a batch or continuous process.

Citrates are known emulsifying agents. Emulsifying agents are used in dairy products to complex calcium in the protein system of the dairy product; peptize, solubilize and disperse protein; hydrate and swell proteins; emulsify fat and stabilize the emulsions; control and stabilize the pH; and form an appropriate dairy product structure after cooling. (See, Caric, et al., *Effects of Emulsifying Agents on the Microstructure and Other Characteristics of Process Cheese*, Food Microstructure, Vol. 4, pgs. 297–298 (1985)).

Importantly, if too much emulsifying agent is added to the process cheese, the cheese will not melt during processing and a hard brick of cheese will form. In contrast, if too little emulsifying agent is added, the cheese will oil off and will not homogenize. Furthermore, by U.S. Government regulations, no more than 3% by weight of the final dairy product can comprise citrates.

The invention involves manufacturing and then dispensing the sodium citrate emulsifying agents as a liquid citrate composition. Specifically, an effective amount of a source of alkalinity is added to a liquid sodium citrate to give a liquid citrate composition with a tri-salt content of above 35 wt-%.

The liquid sodium citrate is an aqueous solution containing disodium citrate and monosodium citrate. The liquid sodium citrate can be stored in a storage tank at a temperature between about 40° F. and 120° F. and preferably containing a preservative of from about 0.01 to 1.0 wt-%.

Preferably, the liquid sodium citrate has a crystallization temperature of below about 110° F. More preferably, the liquid sodium citrate crystallizes at a temperature of below about 100° F., most preferably at a temperature below about 90° F. Thus, the liquid sodium citrate is a homogeneous solution during room temperature storage, and does not require insulated tanks and pipes to keep the sodium phosphates in solution from crystallizing.

The pH of the liquid sodium citrate correlates to the ratio of monosodium citrate, disodium citrate and trisodium citrate in solution. Greater amounts of monosodium citrate are present in acidic solutions compared to greater amounts of trisodium citrate being present in alkaline solutions. Preferably, the liquid sodium citrate comprises a greater concentration of disodium citrate than monosodium citrate. Preferably, pH of the liquid sodium citrate is a pH below about 8.0. More preferably, the pH of the liquid sodium citrate is below about 7.0, most preferably below about 6.0.

The percent by weight of sodium citrates in the liquid sodium citrate is generally between about 5 to 95%. More preferably, there is about 15 to 70% by weight of the sodium citrates in the liquid sodium citrate, most preferably 25 to 60% by weight.

Since alkaline citrate solutions are capable of supporting microbial growth on storage, especially at a temperature above room temperature, e.g. 100°–130° F., a preservative is added to the liquid sodium citrate. Adding the preservative to the liquid sodium citrate is also beneficial to the cheese manufacturer since manufacturers prefer not to use preservatives in the finished product, if necessary. The preservative is added in a range of about 0.01 to 1.0 wt-%, preferably about 0.025 to 0.06 wt-%. The preferred preservative for process cheese is sorbic acid. However, since sorbic acid is not effective above a pH of 7.0, other preservatives such as sodium benzoate may be used for solutions at higher pHs, e.g. trisodium citrate solutions having a pH range of 9.0–9.5.

The source of alkalinity (or base) can be any one of a variety of food grade bases. Preferably, the source of alkalinity is an alkali metal salt. Both sodium and potassium salts can be utilized in the invention, but sodium salts are preferred because potassium salts tend to give a metallic taste to the food product. More preferably, the source of alkalinity includes sodium hydroxide, sodium carbonate, or mixtures thereof. Because a more concentrated solution of sodium hydroxide can be prepared (up to about 50% by weight), the preferred source of alkalinity is sodium hydroxide.

The maximum concentration of a sodium hydroxide solution that can be prepared at room temperature is about 50% by weight. However, if heating is employed, a solution of up to about 70% by weight sodium hydroxide can be prepared. The weight percentage of the solids in the source of alkalinity is preferably about 5 to 70%. More preferably, the percent by weight of solids in the source of alkalinity is about 5 to 50%, most preferably 30 to 50%.

In a preferred embodiment of the invention, the source of alkalinity is added to the liquid sodium citrate. When the source of alkalinity is added to the liquid sodium citrate, a liquid citrate composition is produced in an exothermic, autocatalytic reaction to give a tri-salt citrate in solution. The temperature of the liquid citrate composition can rise to about 170° F. from the energy released in the exothermic reaction between the liquid sodium citrate and the source of alkalinity. This increase in temperature can be advantageously used in the manufacture of a dairy product, specifically, in the production of process cheese to facilitate the melting of the natural cheese.

After the source of alkalinity has contacted the liquid sodium citrate to form the liquid citrate composition, the liquid citrate composition can be added to the process cheese precursor and no dwell (mixing) time is required. Dry sodium citrates conversely are usually added after ½ of the process cheese precursor is put in the cooker to insure adequate mixing. In a typical batch type manufacturing process, the liquid sodium citrate and the source of alkalinity are allowed to mix for about 15 seconds before they are combined with the process cheese precursor. In a typical continuous system the liquid sodium citrate and the source of alkalinity are separately added to the process cheese precursor simultaneously.

In a preferred embodiment of the invention 101 shown in FIG. 1, the sodium hydroxide and the liquid sodium citrate materials are pumped in continuous loops 102 and 103 from the liquid sodium hydroxide and liquid sodium citrate storage tanks 104 and 105 to three way valves 106 and 107. The valves are adjacent to a small stainless steel (or other heat resistant material) batch tank 108 which is connected to load cells 109a–c. The liquid sodium citrate is delivered first into the batch tank 108 via a preprogrammed controller 110 or manually via a weight scale (not shown in FIG. 1). The liquid sodium hydroxide is then added in the same manner. A third valve 111 can then be opened, adding the liquid citrate composition into, for example, a cheese cooker or cheese blender (not shown in FIG. 1) to be combined with the process cheese precursor.

In a continuous process embodiment 201 of the invention, shown in FIG. 2, the liquid sodium citrate and the liquid sodium hydroxide are delivered in continuous loops 204 and 205 from the storage tanks 202 and 203 to three way valves 206 and 207. The liquid sodium hydroxide and the liquid sodium citrate are simultaneously delivered into the continuous process cheese through a metering system 208 that provides information to the preprogrammed controller 210 which controls the amount of each material that is added.

By varying the amount of the source of alkalinity, preferably, sodium hydroxide which is added to the liquid sodium citrate, the final pH of the process cheese can be adjusted. The pH of the process cheese is important because pH can affect the cheese protein configuration and stability in addition to the ability of the sodium citrates to bind calcium. Generally, the pH of a final process cheese is between about 5 to 6.5. A pH of about 5 is near the isoelectric point of the cheese proteins which can cause the process cheese to become crumbly. In contrast, when the pH of the final process cheese is about 6.5, the cheese can become very soft and elastic.

Generally, the weight ratio of the liquid citrate composition to the weight of base on an anhydrous basis is between about 1:1 and 7:1.

EXAMPLE 42 wt-% trisodium citrate was prepared as described above from 87% CITRAFLO, liquid sodium citrate solution containing 44.2 wt-% disodium citrate and 0.025 wt-% sorbic acid, and 13 wt-% of 50% sodium hydroxide solution.

The trisodium citrate solution was ready for use with a cheese food precursor as described above.

What is claimed is:

1. A method of preparing food products comprising the steps of:

(a) contacting a liquid sodium citrate containing from about 0.01 to 1.0 wt-% of a preservative, wherein the liquid sodium citrate is stored at a temperature between about 40° to 120° F., has a crystallization temperature less than about 110° F., has a pH less than about 8.0, and has a greater concentration of disodium citrate than monosodium citrate, with an amount of alkaline base effective to react with said liquid sodium citrate to form a liquid tri-salt citrate composition comprising above 35 wt-% of said tri-salt citrate, wherein the weight ratio of the liquid sodium citrate composition to the weight of base on an anhydrous basis is between 1:1 and 7:1; and (b) combining a process cheese precursor with the liquid citrate composition.

2. The method of claim 1 wherein the liquid citrate composition comprises above 41 wt-% of a tri-salt citrate.

3. The method of claim 1 wherein the base is selected from the group consisting of sodium and potassium hydroxide, sodium and potassium carbonate and mixtures thereof.

4. The method of claim 1 wherein the base is selected form the group consisting of sodium hydroxide, sodium carbonate and a mixture thereof.

5. The method of claim 1 wherein the base is sodium hydroxide.

6. The method of claim 2 wherein the liquid citrate composition comprises about 41 wt-% of tri-sodium citrate.

7. The method of claim 1 wherein the liquid sodium citrate has a pH less than about 7.0.

8. The method of claim 7 wherein the liquid sodium citrate contains from about 0.01 to 1.0 wt-% sorbic acid.

9. The method of claim 8 wherein the liquid sodium citrate contains from about 0.025–0.06 wt-% sorbic acid.

10. The method of claim 1 wherein the total combined weight on an anhydrous basis of citrates in a resulting process cheese is less than about 3%.

11. The method of claim 1 wherein the method comprises a batch system.

12. The method of claim 1 wherein the method comprises a continuous system.

* * * * *